Nov. 20, 1928. 1,692,340
R. B. LATTIN
MOLD FOR MUSICAL INSTRUMENT BODIES OR SIMILAR ARTICLES
Filed Jan. 27, 1927 2 Sheets-Sheet 1
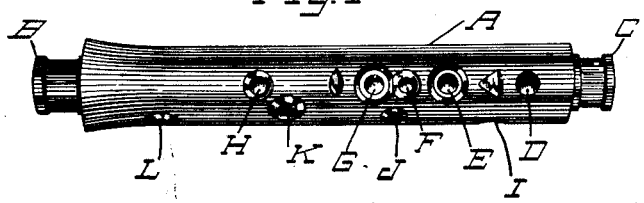
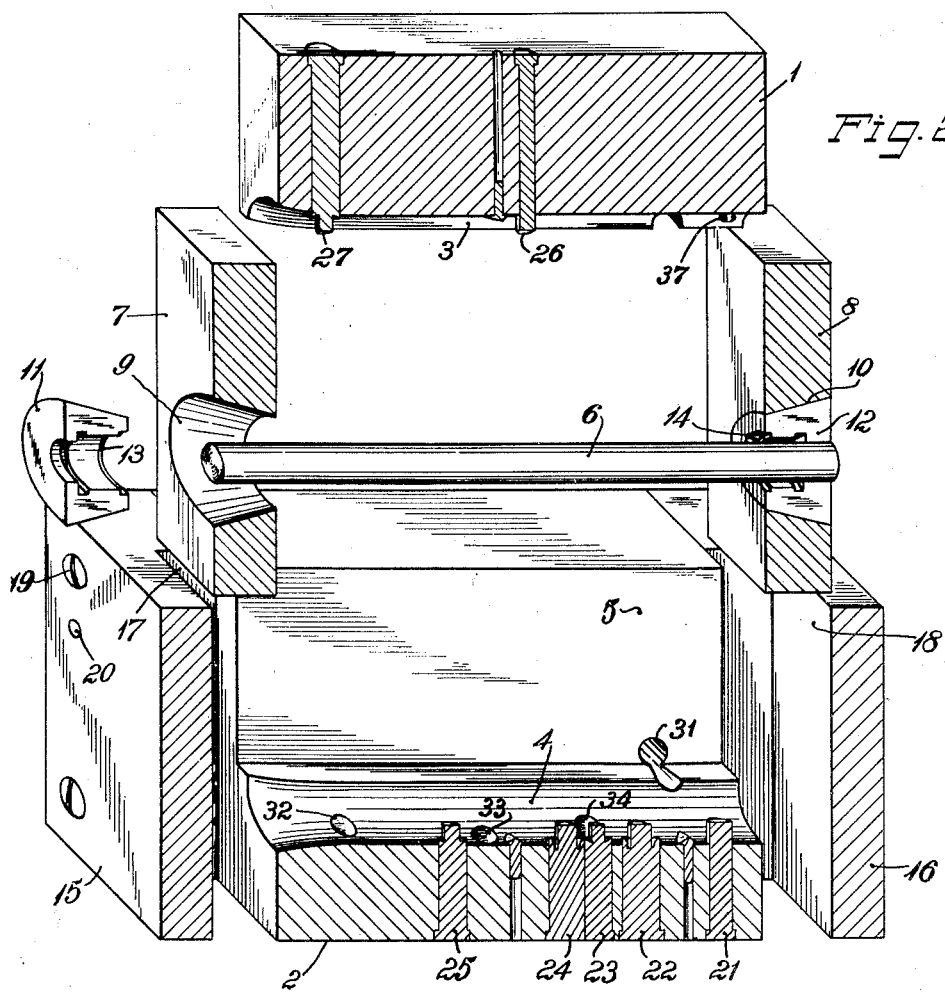
Inventor
Robert B. Lattin
By S. Jay Teller
Attorney Nov. 20, 1928.
R. B. LATTIN
1,692,340
MOLD FOR MUSICAL INSTRUMENT BODIES OR SIMILAR ARTICLES
Filed Jan. 27, 1927   2 Sheets-Sheet 2
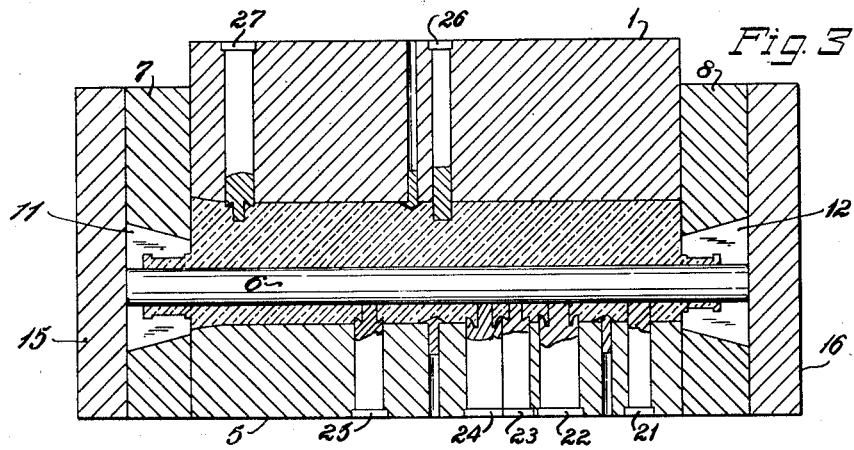
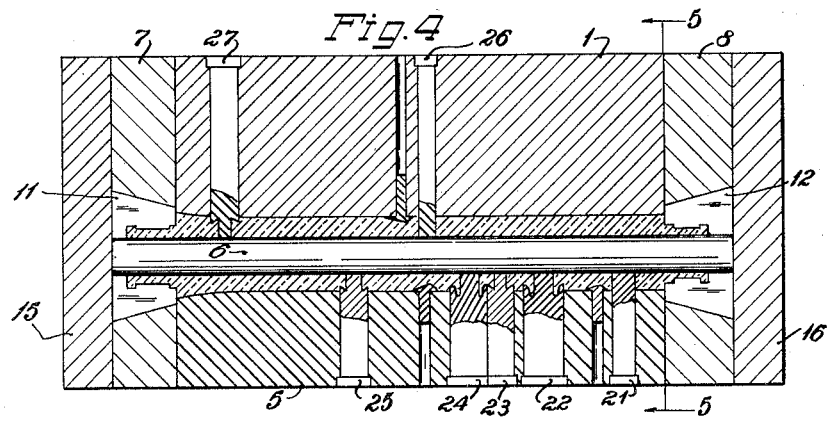
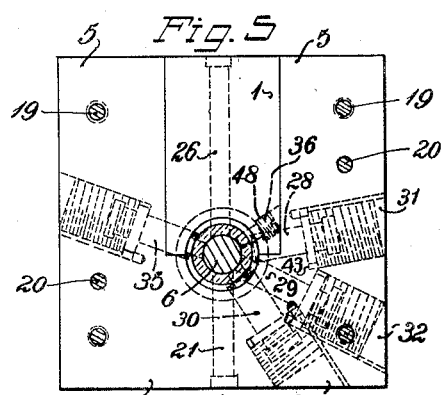
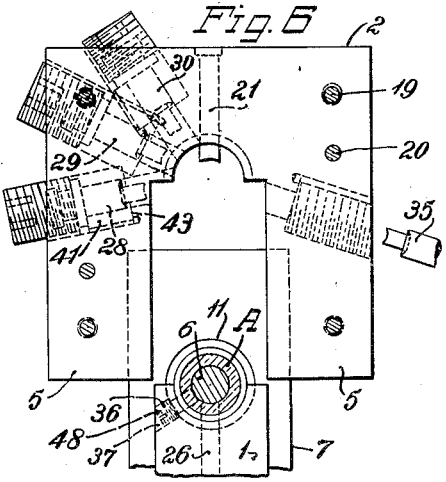
Inventor
Robert B. Lattin
By S. Jay Teller
Attorney Patented Nov. 20, 1928.

1,692,340

UNITED STATES PATENT OFFICE.

ROBERT B. LATTIN, OF WEST HARTFORD, CONNECTICUT, ASSIGNOR TO COLT'S PATENT FIRE ARMS MANUFACTURING CO., OF HARTFORD, CONNECTICUT, A CORPORATION OF CONNECTICUT.

MOLD FOR MUSICAL-INSTRUMENT BODIES OR SIMILAR ARTICLES.

Application filed January 27, 1927. Serial No. 163,924.

The invention is particularly applicable to a mold and a method of molding for the body or a section of the body of a musical instrument, such as a clarinet; but it is to be understood that the invention is not necessarily limited to clarinets. It is further to be understood that the invention in its broader aspects may be applicable to the molding of other articles similar in shape to the bodies of musical instruments.

The principal object of the invention is to provide a mold for articles of the class described, which makes it possible for these articles to be satisfactorily made from molded material without excessive cost and without the necessity for any considerable amount of machine work or other finishing work after the molding operation.

Further and more specific objects of the invention will be apparent from the following specification and claims:

In the accompanying drawings, I have shown one form of a mold adapted for molding a section of a body of a clarinet but it will be understood that the drawings are intended for illustrative purposes only and that without departure from the scope of the invention as set forth in the claims, the shape of the clarinet body, or other article, can be varied and the details of construction of the mold itself can also be varied.

Of the drawings:

Figure 1 is a perspective view of a section of a clarinet body such as can be molded in accordance with the invention.

Fig. 2 is a combined perspective and sectional view showing the parts of the mold separated from each other, the said parts being shown in section along the central vertical plane thereof.

Fig. 3 is a vertical central sectional view showing the parts of the mold in the respective position which they occupy just prior to the final closing of the mold.

Fig. 4 is a view similar to Fig. 3 but showing the parts in their final closed positions.

Fig. 5 is a vertical sectional view taken along the line 5—5 of Fig. 4.

Fig. 6 is a vertical sectional view similar to Fig. 5 but showing the mold in reversed position and showing the parts in the respective positions which they occupy at one stage of the dis-assembling operation.

Fig. 7 is a detailed perspective view showing one of the mold plugs and the operating screw therefor.

Referring to Fig. 1 of the drawings A represents one of the body sections of a clarinet, this section being the conventional design. The body section is tubular and the particular section illustrated is provided with extensions B and C of reduced diameters which are adapted to telescopically engage with other sections of the clarinet (not shown). The section A is provided with a number of substantially radial apertures or openings therein, these being arranged or located in accordance with the ordinary or any desired design for a clarinet. As shown, there are five holes D, E, F, G and H all arranged in a single longitudinal plane and there are other holes, I, J, K, and L located in other planes at different angles to the plane in which are located the holes D to H. There may be still other holes in still other planes, which holes do not show in Fig. 1.

Referring particularly to Fig. 2 of the drawings, 1 and 2 represent the main upper and lower body members of the mold, these two members being separable, preferably along vertical lines. The body members 1 and 2 are provided respectively with registering recesses 3 and 4 which, when the two members are in contact, register with each other and together constitute an opening conforming in shape to the general exterior contour of the clarinet body section or other article to be molded. In the example given, it will be observed that the opening formed by the recesses 3 and 4 does not provide for the extensions B and C which are otherwise formed as will presently be described.

In order to guide the relative movement of the upper and lower body members as they move into or out of engagement, one of the said members is provided with parallel extensions at the sides thereof, these extensions being adapted to engage the parallel outer sides of the other member. As shown, it is the lower member 2 which is provided with the guide extensions, these extensions being shown at 5, 5. These guide extensions 5, 5 are so spaced that the upper body member 1 can slidably move between them into engagement with the lower body member 2 or out of engagement therewith.

A removable core 6 is provided, this core conforming in shape to the interior contour of the clarinet body section or other article to be molded. When the mold is assembled, this core extends longitudinally through the opening formed by the recesses 3 and 4.

For supporting and guiding the core and also for other purposes, I preferably provide two end plates 7 and 8 which are provided respectively with openings into which the end portions of the core 6 project. For an article having no end extensions such as B and C, the openings in the end plates can closely fit the end portions of the core. Preferably, when extensions such as B and C are to be formed, the end plates 7 and 8 are provided respectively with larger openings 9 and 10 which are preferably conical and which are preferably adapted to receive split bushings 11 and 12. The bushings 11 and 12 are provided respectively with recesses 13 and 14 which conform respectively to the exterior contours of the projections B and C. Inasmuch as these bushings are formed in two parts, they can be readily removed from the finished article as will presently appear.

For guiding the end plates 7 and 8 into their proper positions with respect to the main body members, particularly the lower body member, a suitable guiding and holding means is provided. As shown, the lower body member 2 is provided at its ends respectively with guide plates 15 and 16 which have vertical recesses or grooves 17 and 18 therein. These grooves or recesses conform in shape to the respective end plates 7 and 8 and thus the plates 15 and 16 serve to guide the end plates 7 and 8 vertically downward or upward, these guide plates carrying with them the bushings 11 and 12 and the core 6. The plates 15 and 16 are connected with the body member 2 by means of screws 19, 19 and dowel pins 20, 20.

The article to be molded such as the clarinet body section A may have, as already described, several holes which are in the same longitudinal plane and the design of the mold is such that these holes are vertical during the molding operation. For forming the holes, the lower body member 2 is provided with pins or projections 21, 22, 23, 24 and 25, which extend upward into the opening formed by the recesses 3 and 4 and which are adapted respectively to form the holes D, E, F, G and H. There may be other holes in the same plane as the holes D to H, but extending inward from the opposite side of the body section. If so, these are formed by similar pins or projections such as 26 and 27 extending downward from the upper body member 1.

As already described, the article to be molded such as the clarinet body section A has radial holes other than the holes D to H, these other holes being located in planes which are at various angles to the central plane in which are located the central holes D to H. For each of these holes located in a plane other than the vertical central plane, I provide a plug adapted to extent substantially radially into the opening formed by the recesses 3 and 4, this plug extending through a suitable hole in the corresponding body member and being longitudinally movable into or out of operative position.

As shown in Fig. 5, there are three plugs 28, 29 and 30 adapted to extend respectively through holes 31, 32 and 33 in the lower body member 2. These holes are shown in Fig. 2. In addition, there is a plug (not shown) adapted to extend through the hole 34 and there is also a plug 35 adapted to extend through a hole not shown in Fig. 2. It will be understood that the plugs 28, 29 and 30 extending through the holes 31, 32 and 33 form the holes I, L and K respectively, in the clarinet body section A and that the plug extending through the hole 34 forms the hole J. In addition to the plugs described which extend through holes in the lower body member 2, there is also a plug 36 which extends through a hole 37 in the upper body member 1.

In Fig. 7, I have illustrated in detail the construction and mounting of the plug 28 and associated parts. It will be understood that each of the other plugs, except the plug 36, is similar in construction and mounting. The plug is provided with a guide portion 38 which closely fits a corresponding hole in the body member 2 and it is also provided with a core portion 39 which is of the same size as the required hole in the body to be molded. Preferably and as shown, the inner end of the core portion 39 is provided with a concave surface conforming to the exterior of the main core 6. When required by the design of the body to be molded, the end of the guide portion 38 may also extend into the main mold recess and the end of this portion may be bevelled to form a corresponding bevel surface on the said body.

When the core portion of the plug has its inner end surface concave to conform to the exterior of the main core 6, it is necessary to provide means to prevent the plug from turning about its axis and thus enable the said concave surface to properly engage the core. For this purpose, the plug is provided with a suitable projection or key 40 which is adapted to slidably enter and engage a key way 41 formed in the plug aperture in the body.

The central core 6 is necessarily relatively slender and therefore capable of being easily deflected and forced out of normal central position. The inner end of each plug should engage the core but should not be capable of bending or deflecting it. I therefore provide each plug with a suitable stop means to positively limit the inward movement thereof.

As shown, each plug is provided with an enlargement or flange 42 which is located in an enlarged portion of the plug aperture and which is adapted to engage a shoulder 43 at the inner end of the said enlarged portion.

For moving the plug inward or outward, I preferably provide a screw and this screw is preferably arranged with its axis in alignment with the axis of the plug. As shown and as preferred, the aforesaid enlarged portion of the plug aperture is interiorly threaded at 44 and a screw 45 is provided adapted to enter the said enlargement and engage the said threads. As shown and as preferred, the screw is provided with a hexagonal or other non-circular aperture 46 adapted to be engaged by a suitable wrench or driver.

The screw 45 is connected with the plug in such a way that rotation of the screw is permitted, the said construction however holding the two parts so that they move together longitudinally. As shown this construction includes an outward extension 47 on the plug, the extension comprising a relatively small neck and a larger circular collar or flange. The screw 45 is provided with a T-slot 48 extending laterally from one side thereof to the center. This T-slot is adapted to receive the flanged extension 47 and to thus hold the screw and the plug against relative longitudinal movement. Obviously, when the plug and the screw are inserted in the body, they cannot be separated.

The plug 36 may be much more simply constructed than the other plugs described. As shown, it merely has an enlarged threaded portion 48 seated in a threaded enlargement of the plug aperture. The shoulder at the inner end of the enlargement of the aperture limits the inward movement.

In using the mold the preferred procedure is as follows:

1st. The end plates 7 and 8 carrying the bushings 11 and 12 and the core 6 are assembled with the lower body member 2.

2nd. The several plugs carried by the lower body member are moved inward to their innermost positions by means of the corresponding screws 45, the said plugs then engaging the main core 6.

3rd. Any movable plugs such as the plug 36 carried by the upper body member are moved inward to their innermost positions.

4th. The required amount of the moldable material is placed in the mold. The moldable material may be any suitable material adapted to be molded by pressure, but preferably it is a material such as a phenolic condensation compound adapted to be molded by pressure combined with heat. The material may be placed in the mold by hand or otherwise, as desired.

5th. The upper body member 1 is put in place as shown in Fig. 3 and is then gradually forced downward into its final position, the mold preferably being at the same time heated in the manner well known in the art. This downward movement of the upper body member and the attached parts brings the said parts into the relative positions shown in Fig. 4.

After the molding operation is completed, the preferred procedure for disassembling the mold and removing the molded body is as follows:

1st. The several plugs carried by the lower body member 2 are withdrawn by means of the corresponding screws 45, the withdrawal being sufficient to entirely remove the inner core portions 39 from the main mold recess.

2nd. With the mold preferably arranged in reversed position as shown in Fig. 6, the body members 1 and 2 are separated, the molded body together with the core 6, the washers 11 and 12, and the end plates 7 and 8 remaining in assembled relation with the body member 1.

3rd. Any plugs, such as 34, carried by the body member 1 are withdrawn.

4th. The body member 1 is separated from the molded body.

5th. The end plates 7 and 8 and the split washers 11 and 12 are separated from the molded body.

6th. The core 6 is separated from the molded body.

What I claim is:

1. A mold for a hollow article of the type described, comprising in combination separable body members having registering recesses therein which together constitute a mold opening conforming in shape to the exterior contour of the article to be molded, one of the said body members being provided with a hole communicating with the recess therein and having its axis at an angle to the direction of separation of the said members, a removable core normally extending longitudinally through the said mold opening and conforming in shape to the interior contour of the article to be molded, a plug adapted to extend through the said hole in the last said body member and serving to form a correspondingly located hole in the article to be molded, and means operable prior to molding to move the plug inward relatively to the last said body member substantially into position for engagement with the core, the said means serving to hold the plug in fixed relation to the said body member while relative movement between the body members is effected to close the mold and also serving to move the plug outward relatively to the said body member after molding so as to withdraw it from the molded article and thereby permit the said article to be separated from the said body member.

2. A mold for a hollow article of the type described, comprising in combination separable body members having registering recesses therein which together constitute a mold opening conforming in shape to the exterior contour of the article to be molded, a removable core normally extending longitudinally through the said opening and conforming in shape to the interior contour of the article to be molded, a plug adapted to extend into the opening and intersecting the plane of separation between the said body members, the said plug extending through a hole in one of the body members and through a notch in the other body member and serving to form a hole in the article to be molded, and means for moving the plug inward substantially into position for engagement with the core prior to the molding operation and for moving it outward after the molding operation so as to withdraw it from the molded article and thereby permit the said article to be separated from the body members.

3. A mold for a hollow article of the type described, comprising in combination separable body members having registering recesses therein which together constitute a mold opening conforming in shape to the exterior contour of the article to be molded, one of the said body members being provided with a plurality of holes communicating with the recess therein and having their axes at different angles to the direction of separation of the said members, a removable core normally extending longitudinally through the said mold opening and conforming in shape to the interior contour of the article to be molded, a plurality of plugs adapted respectively to extend through the said holes in the last said body member and serving to form correspondingly located holes in the article to be molded, and means operable prior to molding to move the plugs inward relatively to the last said body member substantially into positions for engagement with the core, the said means serving to hold the plugs in fixed relation to the said body member while relative movement between the body members is effected to close the mold and also serving to move the plugs outward relatively to the said body member after molding so as to withdraw them from the molded article and thereby permit the said article to be separated from the said body member.

4. A mold for a hollow article of the type described, comprising in combination separable body members having registering recesses therein which together constitute a mold opening conforming in shape to the exterior contour of the article to be molded, each of the said body members being provided with a hole communicating with the recess therein and having its axis at an angle to the direction of separation of the said members, a removable core normally extending longitudinally through the said mold opening and conforming in shape to the interior contour of the article to be molded, two plugs adapted respectively to extend through the said holes in the said body members and serving to form correspondingly located holes in the article to be molded, and means operable prior to molding to move the plugs inward relatively to the respective body member substantially into position for engagement with the core, the said means serving to hold the plugs in fixed relation to the respective body members while relative movement between the body members is effected to close the mold and also serving to move the plugs outward relatively to the respective body members after molding so as to withdraw them from the molded article and thereby permit the said article to be separated from the said body members.

5. A mold for a hollow article of the type described, comprising in combination separable body members having registering recesses therein which together constitute a mold opening conforming in shape to the exterior contour of the article to be molded, one of the said body members being provided with a hole communicating with the recess therein and having its axis at an angle to the direction of separation of the said members, a removable core normally extending longitudinally through the said mold opening and conforming in shape to the interior contour of the article to be molded, a plug adapted to extend through the said hole in the last said body member and serving to form a correspondingly located hole in the article to be molded, means operable prior to molding to move the plug inward relatively to the last said body member substantially into position for engagement with the core, the said means serving to hold the plug in fixed relation to the said body member while relative movement between the body members is effected to close the mold and also serving to move the plug outward relatively to the said body member after molding so as to withdraw it from the molded article and thereby permit the said article to be separated from the said body member, and means forming a stop supplemental to the said core for limiting the inward movement of the plug when the inner end thereof substantially engages the said core.

6. A mold for a hollow article of the type described, comprising in combination separable body members having registering recesses therein which together constitute a mold opening conforming in shape to the exterior contour of the article to be molded, one of the said body members being provided with a hole communicating with the recess therein and having its axis at an angle to the direction of separation of the said members, a removable core normally extending longitudinally through the said mold opening and conforming in shape to the interior contour of the article to be molded, a plug adapted to extend through the said hole in the last said body member and serving to form a correspondingly located hole in the article to be molded, the inner face of the plug conforming to the shape of the adjacent portion of the core and the plug being held by the body member against rotative movement, and means operable prior to molding to move the plug inward relatively to the last said body member substantially into position for engagement with the core, the said means serving to hold the plug in fixed relation to the said body member while relative movement between the body members is effected to close the mold and also serving to move the plug outward relatively to the said body member after molding so as to withdraw it from the molded article and thereby permit the said article to be separated from the said body member.

7. A mold for a hollow article of the type described, comprising in combination separable body members having registering recesses therein which together constitute a mold opening conforming in shape to the exterior contour of the article to be molded, a removable core normally extending longitudinally through the said mold opening and conforming in shape to the interior contour of the article to be molded, a movable plug adapted to extend into the opening at an angle to the direction of separation of the said body members, the said plug extending through a hole in one of the body members and serving to form a hole in the article to be molded, means for preventing the plug from turning about its axis, and a rotatable screw for moving the plug inward substantially into position for engagement with the core prior to the molding operation and for moving it outward after the molding operation so as to withdraw it from the molded article and thereby permit the said article to be separated from the body members.

8. A mold for a hollow article of the type described, comprising in combination separable body members having registering recesses therein which together constitute a mold opening conforming in shape to the exterior contour of the article to be molded, a removable core normally extending longitudinally through the said mold opening and conforming in shape to the interior contour of the article to be molded, a movable plug adapted to extend into the opening at an angle to the direction of separation of the said body members, the said plug extending through a hole in one of the body members and serving to form a hole in the article to be molded, means for preventing the plug from turning about its axis, and a rotatable screw in axial alignment with the plug for moving the plug inward substantially into position for engagement with the core prior to the molding operation so as to withdraw it from the molded article and thereby permit the said article to be separated from the body members.

9. A mold for a hollow article of the type described, comprising in combination separable body members having registering recesses therein which together constitute a mold opening conforming in shape to the exterior contour of the article to be molded, a removable core normally extending longitudinally through the said mold opening and conforming in shape to the interior contour of the article to be molded, a movable plug adapted to extend into the opening at an angle to the direction of separation of the said body members, the said plug extending through a hole in one of the body members and serving to form a hole in the article to be molded and the said plug having an enlarged cylindrical head at its outer end, means for preventing the plug from turning about its axis, and a rotatable screw in axial alignment with the plug and having a T-shaped opening therein extending to one side thereof for receiving the head of the plug, the said screw serving to move the plug inward substantially into engagement with the core prior to the molding operation and to move it outward after the molding operation so as to withdraw it from the molded article and thereby permit the said article to be separated from the body members.

10. A mold for a hollow article of the type described, comprising in combination separable body members having registering recesses therein which together constitute a mold opening conforming in shape to the exterior contour of the article to be molded, a removable core normally extending longitudinally through the said opening and conforming in shape to the interior contour of the article to be molded, two end plates connectible with the core, and means connected with one body member for guiding the end plates to bring the core into its normal position.

11. A mold for a hollow article of the type described, comprising in combination separable body members having registering recesses therein which together constitute a mold opening conforming in shape to the exterior contour of the article to be molded, a removable horizontal core normally extending longitudinally through the said mold opening and conforming in shape to the interior contour of the article to be molded, two end plates connectible with the core, means connected with one body member for guiding the end plates to bring the core into its normal position, a plug adapted to extend into the opening at an angle to the direction of separation of the said body members, the said plug extending through a hole in one of the body members and serving to form a hole in the article to be molded, and means for moving the plug inward substantially into position for engagement with the core prior to the molding operation and for moving it outward after the molding operation so as to withdraw it from the molded article and thereby permit the said article together with the core and the end plates to be separated from the lower body members.

12. The hereindescribed method for molding a hollow article having a plurality of radial holes therein in different radial planes, the said method consisting in providing a mold having at least two main body members radially separable from each other, providing radial plugs corresponding in number and in relative positions to the said radial holes in the article to be molded, at least one of the plugs being radially movable into and out of the main mold recess, moving the movable plugs radially inward into the main mold recess prior to the molding operation, filling the mold recess and closing the mold to effect molding, moving the said movable plugs radially outward out of the molded article, and finally opening the mold and removing the molded article.

ROBERT B. LATTIN.